INVENTORS
PAUL M. ERLANDSON &
WARREN F. HOWELER

BY Mason, Porter, Diller & Stewart
ATTORNEYS

INVENTORS
PAUL M. ERLANDSON &
WARREN F. HOWELER

BY Mason, Porter, Diller & Stewart
ATTORNEYS

United States Patent Office 3,440,392
Patented Apr. 22, 1969

3,440,392
CONTAINER FABRICATION MEANS UTILIZING AN ELECTRON BEAM
Paul M. Erlandson, Palos Park, and Warren F. Howeler, Oak Lawn, Ill., assignors to Continental Can Company, Inc., New York, N.Y., a corporation of New York
Filed Dec. 2, 1964, Ser. No. 415,341
Int. Cl. B23k 9/12; B21d 19/00
U.S. Cl. 219—124                               19 Claims

ABSTRACT OF THE DISCLOSURE

Methods and apparatus for container fabrication including electron beam welding provisions for joining container bodies with container ends. Electron beam welding devices are employed in cooperation with production container handling apparatus for serially and continually applying electron beam welding techniques in container formation. Each of the containers in advanced to a work station and an electron beam is applied to a seam portion of the container to effect a line of weld along the full length of the seam portion. The beam may be directed to impinge upon an outer overlying edge portion of either the container body or container end to provide a weld nugget which extends through the overlying portion and into an underlying portion of the container.

This invention relates to container fabrication means and more specifically to a method and apparatus for securing a container end to a container body by utilizing electron beam welding means.

One of the great difficulties in the fabrication or manufacture of very thin metal or of composite containers has been the means for attaching the end members to the body member with sufficient strength to resist internal pressures such as is encountered in containers used for carbonated beverages. Presently known containers must generally employ end to body attachments consisting of the rolling of the separate sheets of metal to form an interlocked seam which is gasketed in various ways with compounds. Accordingly, such fabrication methods produce containers having high reject rates due to incomplete closure of the seams, which permit leaking of any contents within the container. The present invention provides for the direct union of the metals forming the body and end units into a single piece by using a welding process for attachment of the end members. A specific method of welding which is proposed by this invention is the employment of the electron beam welding feature which is capable of joining either similar or dissimilar metals, so that a great flexibility in the choice of materials is achieved. In addition, a substantial savings in material is effected. Also, the employment of this invention would eliminate the use of the sealing compounds presently used to assure a leak-proof container fabricated by the rolling of the separate sheets of metal to form an interlocked seam.

The employment of a welding process involving an electron beam will permit the utilization of materials heretofore considered unusable for metallic container design. In the past, very brittle or stiff materials could not be employed due to the necessity of curling, beading, crimping, rolling or seaming these materials into the conventional end seam configurations. The present invention partially or entirely eliminates these previous operations so that little attention need be given to the type of material employed. Very hard tinplate as well as extremely strong but relatively inflexible alloys of steel, aluminum, etc. may be joined by means contemplated by the present invention.

As set forth previously, prior metal containers were joined by driving a seaming roller over the separate sheets of metal to form an interlocked seam. As contemplated by the present invention, electron beam welding of the container end to the container body eliminates the problem of the seaming roller jumping over the multi-thickness body side seam since no parts contact the end or the body in this area. The jumping of the seaming roller may induce leakage of the container when filled with a suitable liquid. It will be intuitively clear, that no problems of this type are generated as a result of electron beam forming of the seam.

In manufacturing processes where metal is worked and stressed at high speeds, it is inevitable that imperfect quality control of the metal production process may result in defects in the metallic structure. These defects are enhanced by the metal forming processes which involve relatively severe working of the material such as are commonly encountered in the normal process of container fabrication. More specifically, the employment of double reduced tinplate in the manufacture of high quality containers such as for liquid beverages has been plagued by such defects as flange cracks, double seaming cracks, sensitivity to grain orientation of the material, etc. In the practice of the present invention, the forming of the end container units involves very little, if any, working of the material, the amount of working depending upon the specific container design. In addition, thermal stresses are confined to the highly localized area which is very small and within the weld interface.

If metal container fabrication techniques are to be truly successful, the containers must be fabricated and/or closed at a rapid rate. The speed of such operation by present day equipment is primarily limited and severely handicapped by the necessity of rotating the container body and end units at high speeds during the closing process in order to produce contact of the entire circumference of the container with the seaming chuck. Although rotation of the container may be employed with the present invention, such rotation is no longer essential since the electron gun, or guns if a plurality of guns are employed, may be rotated simply and rapidly about the containers while they are traveling on a linear conveyor. Moreover, the rotating equipment can be completely eliminated since circular or other electronic deflection, such as electrostatic or electromagetic deflection, of the electron beam could be utilized to traverse the desired welding area. In addition, it is obvious that the invention may be employed with containers having shapes other than circular, such as triangular, square, rectangular, pentagonal, etc. In the case of closing filled cans or containers, the advantages of eliminating the mechanical motion of the container are obvious.

Accordingly, it is the principal object of the present invention to improve container fabrication techniques.

It is a further object of the present invention to improve container fabrication techniques employing electron beam welding.

It is a further object of the present invention to improve metal container fabrication techniques which provide economy of operation and a container possessing greater durability.

It is a further object of the present invention to improve metal container fabrication techniques employing electron beam welding which provides improved reliability in the product.

It is a further object of the present invention to improve metal container fabrication techniques which permits greater flexibility in the design of the container.

It is a further object of the present invention to improve container fabrication techniques which eliminate the employment of seaming rollers and many procedures heretofore required in container fabrication.

It is a further object of the present invention to permit high fabrication speeds of metallic containers which employ electron beam welding means in the process.

It is a further object of the present invention to provide electron beam welding means for fabrication and sealing of containers which permits precise control of the welding beam.

The present invention contemplates a method and apparatus wherein container ends are joined to the container body by causing a small diameter intense beam of electrons from a conventional electron beam welding gun to traverse all or part of the juncture between the container body and the container end. The welding process forms a "weld nugget." The electrons exert a heating action on the metal on which they are directed, melting the weld nugget area and vaporizing some of the material to form a channel through which electrons are conducted into the depth of the juncture. The process proceeds at high speed with immediate solidification of the molten material upon removal of the electron beam due to heat losses to the adjacent structures. Advantage is taken in this operation of the fact that penetration of an electron beam into the metal is a function both of the beam energy in volts and of the speed of the electron gun relative to the work. By maintaining a high surface velocity through rotating the electron gun about the workpiece, electrical deflection of the beam or by rotating the workpiece relative to the electron gun, it is possible to limit penetration of the beam into the material so that, for example, the container end is penetrated entirely by the beam whereas the portion of the container body inside the end is only partially penetrated. One of the outstanding features of the electron beam welding technique as taught by the present invention, is the improved reliability of the product due to its adaptability to control. The welding procedure may be controlled by modulating the intensity of the electron beam current; the magnitude of the accelerating voltage; the position of the beam; the distance from the target to the electron gun; or, the speed of the target relative to the electron gun rotation.

In a preferred embodiment of the invention, containers are advanced from a feed turret to a rotatable platform wherein a partial vacuum is maintained in a chamber surrounding the platform. At one point in the periphery of the rotatable plateform, the containers are advanced to a second rotating platform known as the work station. Within the work station, a plurality of work positions are maintained, each of the work positions supporting an electron beam gun which revolves along with and may be affixed to the rotating work station. In addition to the rotation of the container upon the work station, each of the containers individually revolve about their ceners to provide a means whereby the electron beam may traverse the desired welding zone. A low pressure is maintained within the work station which facilitates the focusing of the electron beam. At a predetermined point in the travel of each container through the circular work station, means for provided to transfer the fabricated or welded container to a discharge turret for removal from the work station.

In the event that both the upper and lower container ends are to be affixed to the container body, an upper and a lower electron beam gun is provided to simultaneously or sequentially affix both container ends. In addition, it will be intuitively clear that a first gun may be so positioned to secure the bottom container end to the container body and a second electron beam gun positioned at a later work station to affix the upper container end to the container body, after a filling operation has taken place within the container.

The invention both as to its organization and method of operation together with further objects and advantages thereof will best be understood by reference to the following specification taken in conjunction with the accompanying drawings in which.

Figure 1:
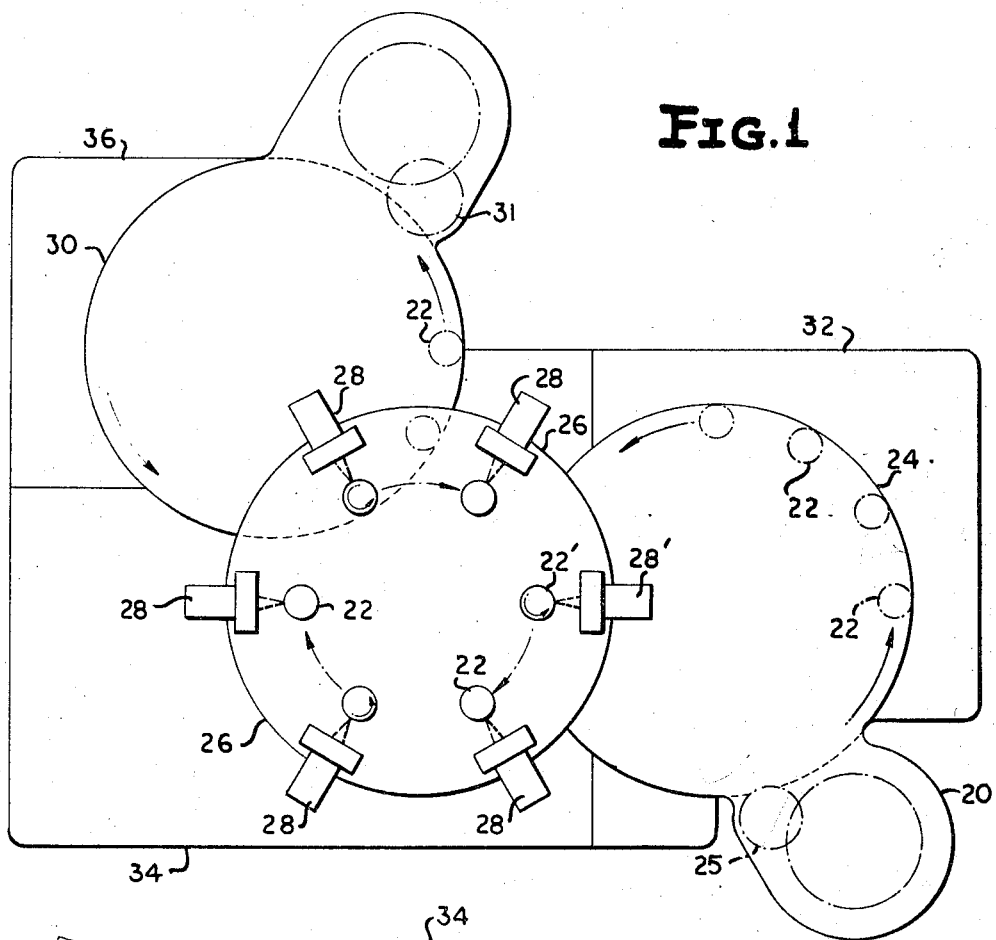
FIGURE 1 is a plan view showing the container advancing means and the electron beam guns.

With reference to the plan view of the FIGURE 1, a container feed turret 20 advances the containers 22 to a delivery turret 24. The turret 24 may be advanced by a means 25 which may be a motor or a gear coupled to a driving means. It will be noted that the delivery turret 24 is circular and rotates in a counterclockwise manner in the present embodiment. The container feed turret 20 delivers the containers 22 along the periphery of the delivery turret 24 in such a manner that the containers 22 are advanced seriatim along its periphery to a work station or turret 26. The work turret 26 rotates by conventional manner, not shown, in a clockwise manner and supports a plurality of work positions, a work position at each of the equally spaced electron beam guns 28. In the particular embodiment, it will be noted that there are six work positions, thus, necessitating six electron beam guns 28.

As the container delivery turret 24 advances the containers 22 toward the work turret 26, the containers 22 are transferred to the work turret 26 at the junction point where the peripheries of a circle through the center point of the containers 22, upon the delivery turret 24 and work turret 26, join. For example, the container 22' positioned adjacent the electron beam gun 28' has just passed from the turret 24 to the turret 26 and the electron beam gun 28' would now be actuated to perform a welding operation. As the work turret 26 rotates in a clockwise manner, each of the containers 22 rotates in a counterclockwise manner so that the electron beam from its respective electron beam gun 28 would effectively weld the entire container end to the container body.

The containers 22 are transferred from the turret 24 to the work turret 26 at the position of the hour hand of a clock as represented by approximately 3 o'clock. Similarly, adapting the same nomenclature, the containers 22 are advanced to a discharge turret 30 at approximately 11 o'clock. The discharge turret 30 rotates in a counterclockwise manner and is driven by driving means 31 to effectively and generally remove the container 22 from the work turret 26 to an output station as represented by the discharge turret 30. From the discharge turret 30, the containers may be advanced by a conventional conveying means, not shown.

In the event that it is desired to weld the containers in a vacuum or an inert atmosphere, a cover means 32, may be employed to enclose substantially all of the delivery turret 24. It will be understood that the cover means 32 is shown only in outline in order that the principles of the invention not be obscured. Within the chamber formed by the cover means 32, a partial vacuum may be maintained. Receiving substantially all of the work turret 26 area, is a chamber which is enclosed by a cover means 34. Within this chamber surrounding the work turret 26, it may be desirable to reduce the pressure still further than that within the chamber enclosed by the cover means 32 so that the electron beam guns may operate more efficiently. Further, in order that the low pressure be maintained within the chamber enclosed by the cover means 34, a third cover means 36 may enclose a chamber formed about the discharge turret 30.

It will be understood that in the event that an inert or other atmosphere is desired, then the required atmosphere could be maintained within the chambers defined by the cover means 32, 34 and 36 by means not shown. In addition, it will be understood that the turrets 24, 26 and 30 would be rotated by conventional means and that the containers 22 would be similarly rotated by conventional means, not shown. Also, the electron beam guns 28 would be secured in such a manner that they would rotate with the work turret 26. A further modification will be intuitively clear wherein the electron beam guns 28 would rotate while the containers 22 would remain in a relatively fixed position with reference to the work turret 26.

Figure 2:
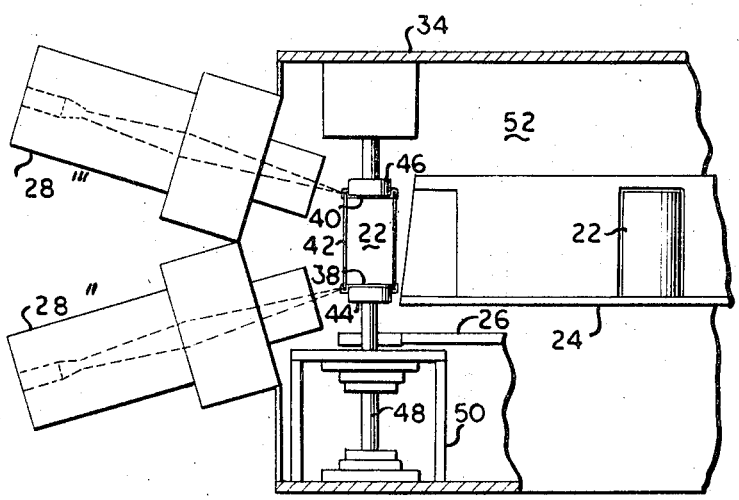
FIGURE 2 is a fragmentary elevation view showing an embodiment wherein both the upper and lower container end may be affixed to the container body by a plurality of electron beam guns.

As shown in the fragmentary elevation view of the FIGURE 2, a pair of electron beam guns 28″ and 28‴ are connected to the cover means 34 and have their beams directed to, respectively, weld a lower container end 38 and an upper container end 40 to a container body 42 to form the container 22. The containers 22 have been advanced by the delivery turret 24 to one of the work stations on the work turret 26 as shown by the position of the container 22 in the FIGURE 2. A lower chuck 44, rotated by a shaft 48, engages the lower container end 38 and an upper chuck 46 engages the upper container end 40 to cause rotation of the container 22 in the desired manner. The chucks 44 and 46 are vertically reciprocating to permit placement of the containers. A chuck support 50 is positioned below the container 22 to support the container 22 and the lower and upper chucks 44 and 46 in the vertical position, as shown. Within the chamber 52 defined by the cover means 34, the desired atmosphere may be maintained either above or below atmospheric pressure and the desired gas injected into the chamber 52.

Figure 3:
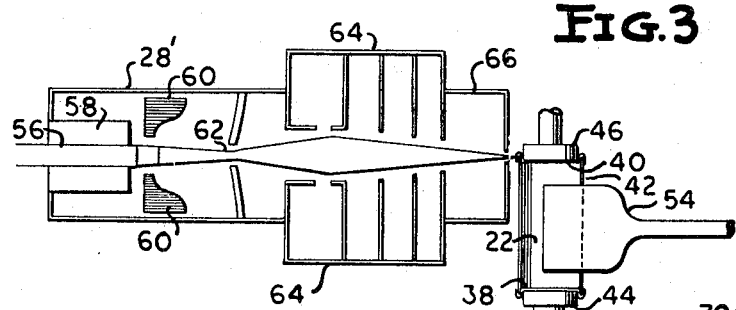
FIGURE 3 is an elevation view showing the details of an electron beam gun and its focusing upon a target such as a container.
Figure 4:
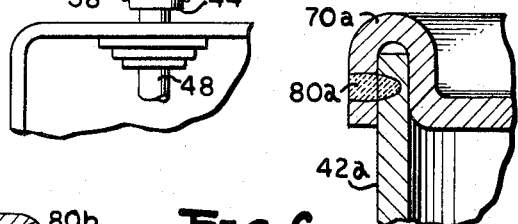
FIGURES 4–12 are fragmentary views illustrating container ends secured to container bodies by the weld nuggets.

With reference to the FIGURE 3, the details of an electron beam gun welder are shown as being applied to the upper container end 40 to cause a weld to be performed between the container end 40 and the container body 42. The container 22 would be advanced by a pair of rotating chucks 44 and 46, placed respectively, below and above the container 22 to cause rotation thereof. An indexing turret 54 is positioned horizontally to the work station defined by the rotating chucks 44 and 46 and causes an advancement of the containers 22 into the work station.

The electron beam gun 28′ shown in the FIGURE 3 and utilized in the welding process, includes a cathode 56 and a control grid 58. A focusing coil 60 directs the electron stream through an aperture 62 to a plurality of beam forming and accelerating grids within a housing 64. The area 64 enclosing the beam forming and accelerating grids may be evacuated while a chamber 66 positioned between grid 64 and the target (the container end 40 on the container 22) may house an atmosphere such as helium.

With reference to the FIGURES 4–12, these fragmentary views illustrate portions of the joining of a container end to a container body and the position of the weld nugget. As shown in the FIGURE 4, a hooked container end 70a is partially telescoped over a container body 42a and a weld nugget 80a is formed to completely penetrate the external portion of the hook while only partially penetrating the container body member 42a.

Figure 5:
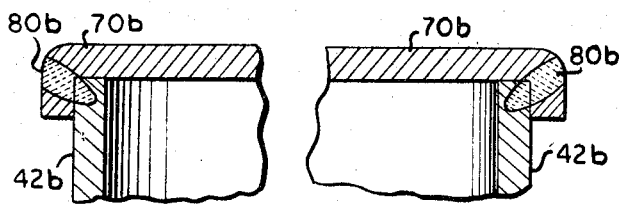

In FIGURE 5, there is shown a container end 70b having a depending skirt which is telescoped over a container body 42b while the weld nugget 80b is positioned at approximately 45 degrees to the container axis to completely penetrate the container end 70b at the skirt radius of the container end 70b and to partially penetrate the container body 42b.

Figure 6:
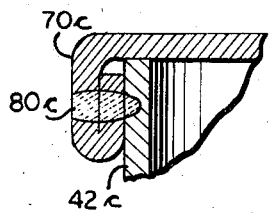

In the hemmed skirt configuration shown in the FIGURE 6, a container end 70c engages a container body 42c while a weld nugget 80c, directed substantially horizontally (which is perpendicular to the container body 42c), completely penetrates both thicknesses of the metal forming the hemmed skirt while only partially penetrating the container body 42c, which results in an effective and reliable seal of the container end to the container body.

Figure 7:
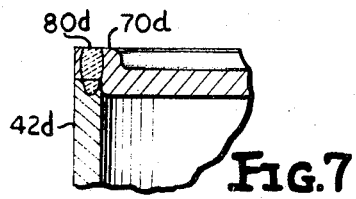

In the FIGURE 7, an end 70d having a recessed end panel engages and rests upon a container body 42d. The weld nugget is directed substantially vertically and completely penetrates the container end 70d while partially penetrating the container body 42d to effect the seal.

Figure 8:
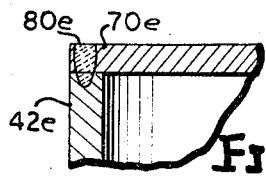

As shown by the FIGURE 8, an abutting container end 70e mates with a container body 42e and the substantially vertical weld nugget 80e completely penetrates the container end 70e while forming and only partially penetrating the container body 42e.

Figure 9:
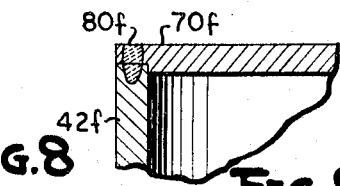

In the notched container end 70f of the FIGURE 9, the weld nugget 80f penetrates the container end 70f and into the container body member 42f.

Figure 10:
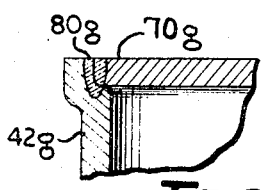

With reference to the FIGURE 10, the offset container body 42g mates with and engages a container end 70g and the substantially vertical weld nugget 80g completely encloses the junction between the two members 42g and 70g to form an effective seal of the container end 70g to the container body 42g.

Figure 11:
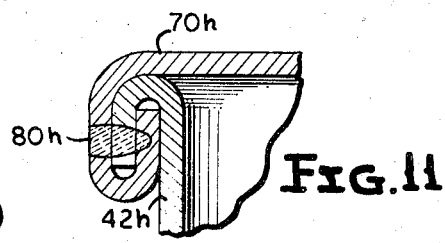

As shown in the FIGURE 11, a conventional double seam is formed between a container end member 70h and a container body 42h. The weld nugget 80h is substantially horizontal and penetrates the two outside thicknesses of the double seam and a portion of the third thickness to complete the seam. It will be understood that the weld nugget could penetrate the fourth thickness if such were desired.

Figure 12:
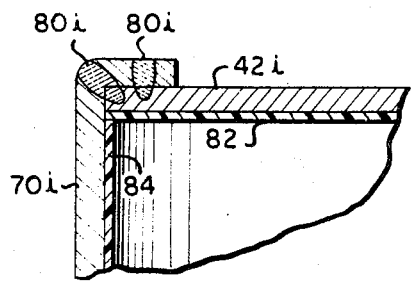

As shown in the FIGURE 12, a composite structure is illustrated. In this configuration, the cross-hatched areas 82 and 84 represent a polymeric material such as vinyl polyethylene, etc. The polymeric material 82 and 84 is laminated to a container body 42i and a container end 70i, respectively. The thickness of the metallic material in the members 42i and 70i may be proportionately reduced in thickness to compensate for the additional strength provided by the polymeric material 82 and 84. The weld nuggets are illustrated at 80i and 80j. The weld nugget 80i is at substantially 45 degrees to the axis of the container and completely penetrates the container end 70i at the 90 degree bend and partially engages a corner of the container body 42i. The weld nugget 80j is substantially vertical and, as shown, penetrates the container end 70i and partially penetrates the container body 42i. Thus, it will be seen that a dual welded seam is effected by the configuration shown in the FIGURE 12. In addition, it will be evident that it is possible to induce sufficient heat into the electron beam welding process to cause a heat sealing of the two polymeric materials 82 and 84 at their junction.

Thus, there has been described an apparatus and process for effectively and reliably improving the fabrication of container ends to container bodies by the employment of an electron beam gun to form a weld between the two members. The ability of the small diameter electron beam to concentrate heat into precisely the desired volume can thus be employed to achieve new, improved and unexpected results. The fabrication of containers has been simplified by the elimination of seaming rollers and their inherent problems. In addition, the present invention permits high manufacturing speeds heretofore unknown. By the practice of the present invention, a container is produced which displays improved resistance to abuse (a more rugged container) while permitting a material savings both on the body and the end of the container by eliminating expensive and time-consuming double seaming and flanging which was necessary to aid in low reject rates of heretofore known equipment. In addition, many of the steps of previous operations such as curling, beading, crimping, rolling and seaming have been eliminated so that a greater flexibility of container design is achieved through the many

What is claimed is:

1. Container fabrication means for automatically and continually securing container ends to container bodies comprising means for serially advancing a plurality of containers to a work station, means for rotating each container at said work station, electron beam welding means positioned upon said work station, said welding means focused to direct its electron beam upon a portion of a container which is common to both said container ends and said container bodies whereby the entire periphery of each container body is welded, and means for serially removing welded containers from said work station.

2. Container fabrication means for securing a container end to a container body comprising a delivery turret for receiving containers, means for advancing said delivery turret, a work station juxtaposed said delivery turret for receiving containers from said turret, means defining a plurality of work positions upon said work station, each of said work positions adapted to receive a container from said delivery turret, means to rotate said work station commensurate with said delivery turret, means for individually rotating each of said work positions with respect to said work station, electron beam welding means positioned juxtaposed each of said work positions and capable of performing a welding operation to effect a seal between a container end and a container body, and a discharge turret for receiving welded containers from said work station at a predetermined time during the rotation of said work station.

3. The combination as defined in claim 2 wherein said work station and said work positions upon said work station are in contra-rotating relationship.

4. The combination as defined in claim 2 including individual means for enclosing said delivery turret, said work station and said discharge turret for providing in each of said enclosures a gaseous atmosphere at a pressure other than atmospheric.

5. Container fabrication means for continually securing container ends to container bodies comprising a work position, means for continually and automatically delivering containers to said work position for performing a welding operation at said work position, a first electron beam welding source positioned adjacent said work position for repeatedly directing its output upon said containers at a position where a container end engages a container body, a second electron beam welding source positioned adjacent said work position for repeatedly directing its output upon said containers at a position where a second container end engages the container body, and means for continually and automatically removing containers from said work position.

6. Container fabrication means for continually securing container ends to container bodies comprising a work position, means for continually and automatically delivering containers to said work position for performing a welding operation at said work position, a first electron beam welding source positioned adjacent said work position for repeatedly directing its output upon said containers at a position where a container end engages a container body, a second electron beam welding source positioned adjacent said work position for repeatedly directing its output upon said containers at a position where a second container end engages the container body, means to rotate the containers positioned at said work position with respect to said electron beam welding sources, and means for continually and automatically removing containers from said work position, said means for delivering being positioned in cooperation with said means to rotate for continually placing containers in operative relation with said means to rotate, and said means for removing being positioned in cooperation with said means to rotate for removing containers from operative relation with said means to rotate.

7. Container fabrication means for continually securing container ends to container bodies comprising a work position, means for continually and automatically delivering containers to said work position for performing a welding operation at said work position, a first electron beam welding source positioned adjacent said work position for repeatedly directing its output upon said containers at a position where a container end engages a container body, a second electron beam welding source positioned adjacent said work position for repeatedly directing its output upon said containers at a position where a second container end engages the container body, means to rotate said electron gun welding sources with respect to a container at said work position, and means for continually and automatically removing containers from said work position.

8. The combination as defined in claim 5 including means for enclosing said work position for providing a gaseous atmosphere at a pressure other than atmospheric.

9. A method for continually fabricating metal containers having a pair of container ends and a container body comprising the steps of serially and continually delivering assembled but unsealed containers to a work station, rotating each container, electron beam welding one container end to the container body, electron beam welding the other container end to the opposite end of the container body, introducing an atmospheric condition about the container which is other than normal atmosphere and serially and continually discharging the fabricated container from the work station.

10. The combination as defined in claim 1 further comprising electron beam deflection means for moving the electron welding beam along the portion of the container common to the container end and body.

11. Production line can fabrication apparatus for joining can bodies to can ends including means for serially delivering a plurality of thin metal can bodies and thin metal can ends, electron beam welding means focused to direct an electron beam of small cross-section along a predetermined path, said means for delivering comprising means for moving said can ends and can bodies into alignment with said electron beam welding means, work station means for supporting can ends and can bodies in abutment along intersecting edge portions thereof and including means in alignment with said electron beam welding means for rotating the intersecting edge portions through said predetermined electron beam path and means for automatically removing joined can bodies and can ends from said work station means upon movement of the entire length of said intersecting edge portions through said path.

12. Production line can fabrication apparatus comprising a rotatably mounted can support table, a plurality of can supporting and rotating means mounted upon said table for rotation relative to said table, a plurality of electron beam welding means each mounted on said can support table for movement therewith and adjacent one of said can supporting and rotating means and focused to provide an electron beam of small cross-section along a predetermined path, means for serially and continually delivering cans onto said table for the welding thereof, and means for serially and continually removing cans from said table following the welding thereof, said can supporting and rotating means each including means for engaging the cans and aligning adjacent end and body portions with said predetermined electron beam path for rotation through said predetermined path to effect a line of weld along said adjacent portions.

13. Container fabrication apparatus for joining container ends and container bodies wherein one of said container end and body includes an edge portion overlying an edge portion of the remaining one of said end and body; container supporting means for supporting an assembled but unjoined container end and body, electron beam welding means for providing a focused electron welding beam, said electron beam welding means being mounted adjacent said container supporting means for directing the beam thereof against said overlying edge portion for producing a weld between both said edge portions on the side of said overlying edge portion opposite said electron beam welding means.

14. Container fabrication apparatus for joining container bodies and ends along a seam portion including a first edge portion of a container body and a second edge portion of a container end, one of said first and second edge portions being in outer overlying relation to the remaining edge portion; the apparatus comprising container support means for supporting the container bodies and container ends with said first and second edge portions in assembled, overlapping relation, electron beam welding means positioned adjacent said container support means proximate the area at which said seam portion is maintained by said support means, said electron beam welding means being focused to produce an electron beam along a predetermined path, said support means positioning said one of said first and second edge portions which is in overlying relation directly intermediate said electron beam welding means and said remaining edge portion and in said predetermined path, the electron beam impinging upon the exterior of said one edge portion on the exterior thereof to provide a joining of the one edge portion and remaining edge portion on the side of the one edge portion opposite said electron beam welding means, and means producing relative movement of the beam and seam portion causing said beam to impinge along the full length of said seam portion.

15. A method of fabricating containers in production line quantities comprising supplying a number of container ends and container bodies, automatically serially and continually delivering the container ends and bodies to a work area, supporting the container ends and bodies in assembled relation at said work area, moving the assembled container ends and bodies along a predetermined route at the work area, supporting an electron beam welding device adjacent the route, moving the electron beam welding device adjacent the route of the assembled container ends and bodies, directing an electron beam along a predetermined path from the electron beam welding device to a seam portion of the assembled container ends and bodies to produce a weld joining the ends and bodies, moving the beam and seam portion relative to one another to cause the beam to impinge along the full length of the seam portion, and automatically serially and continually removing the joined ends and bodies upon the completion of a continuous line of weld along the seam portion.

16. The method of claim 15 wherein the step of supplying container ends and bodies includes providing a polymeric layer on the interior of each of said ends and bodies, said step of directing an electron beam further including heating the polymeric layers of the ends and bodies to provide a seal therebetween.

17. The method of claim 15 wherein the step of moving the beam and seam portion relative to one another includes rotating the ends and bodies during the step of moving the same along a predetermined route.

18. The method of claim 16 wherein the step of moving the assembled ends and bodies along a predetermined path includes providing a rotating support table, locating the assembled ends and bodies on the support table and rotating the support table to cause the assembled ends and bodies to follow a circular path; the step of moving the electron beam welding device including supporting the beam welding device adjacent the locations of the ends and bodies supported on the table and moving the beam welding device along a second circular path adjacent the first mentioned circular path, whereby welding is effected serially and continually during the movement of the ends and bodies in the work area.

19. A method of fabricating containers by joining container bodies and ends along a seam portion including a first edge portion of a container body and a second edge portion of a container end wherein one of the first and second edge portions is provided in outer overlying relation to the remaining edge portion; the method comprising supporting the container bodies and container ends with the first and second edge portions in assembled, overlapping relation, positioning an electron beam welding device adjacent the place at which the container is supported and proximate the area at which the seam portion is maintained, focusing an electron beam against the exterior of the one edge portion in outer overlying relation and on the side thereof opposite the remaining edge portion, and imparting relative movement between the beam and seam portion to provide impinging of the beam along the full seam portion to produce a continuous weld nugget extending through the one edge portion from the points at which the beam impinges thereon and into the underlying remaining edge portion.

References Cited

UNITED STATES PATENTS

| | | | |
|---|---|---|---|
| 1,141,517 | 6/1915 | Andrews | 219—81 |
| 1,601,929 | 10/1926 | Tobey | 219—81 |
| 2,172,402 | 9/1939 | Nordquist | 113—1 |
| 2,567,094 | 9/1951 | Belada | 113—121 |
| 2,932,720 | 4/1960 | Stohr | 219—121 |
| 3,156,810 | 11/1964 | Samuelson | 219—121 |
| 3,245,370 | 4/1966 | Bofinger | 113—121 |
| 3,247,355 | 4/1966 | Olsen | 219—85 |
| 3,290,478 | 12/1966 | Morley | 113—30 |
| 3,151,231 | 9/1964 | Steigerwald | 219—121 |

FOREIGN PATENTS

| | | |
|---|---|---|
| 909,725 | 10/1962 | Great Britain. |
| 220,391 | 2/1924 | Great Britain. |

RICHARD M. WOOD, *Primary Examiner.*

W. DEXTER BROOKS, *Assistant Examiner.*

U.S. Cl. X.R.

113—30; 219—64, 121, 159